United States Patent [19]

Chen

[11] Patent Number: 4,934,531
[45] Date of Patent: Jun. 19, 1990

[54] STORING BOX FOR CASSETTE

[76] Inventor: Shun-Teng Chen, No. 9, Lane 390, Section 2, Wan-Chun Road, Tao-Yuan, Taiwan

[21] Appl. No.: 291,617

[22] Filed: Dec. 29, 1988

[51] Int. Cl.⁵ .......................................... B65D 85/672
[52] U.S. Cl. .................................. 206/387; 220/4 F; 220/345; 312/12
[58] Field of Search ............... 206/387; 220/4 F, 4 R, 220/345; 312/9, 12, 263, 330 R

[56] References Cited

U.S. PATENT DOCUMENTS

| | | | |
|---|---|---|---|
| 3,003,839 | 10/1961 | Bloom et al. | 312/330 |
| 4,171,150 | 10/1979 | Soderlund | 312/263 |
| 4,182,538 | 1/1980 | Armistead | 206/387 |
| 4,819,798 | 4/1989 | Hasuike | 206/387 |

FOREIGN PATENT DOCUMENTS

| | | | |
|---|---|---|---|
| 2735137 | 2/1979 | Fed. Rep. of Germany | 312/330 R |
| 7709480 | 3/1979 | Netherlands | 206/387 |
| 8601330 | 2/1986 | World Int. Prop. O. | 312/12 |

*Primary Examiner*—Jimmy G. Foster
*Attorney, Agent, or Firm*—Morton J. Rosenberg; David I. Klein

[57] ABSTRACT

A storing box for cassette comprising a base, a cover and a plurality of drawers. The base includes a bottom plate which has a plurality of V-shaped ribs on bottom surface, a pair of side plates, a front plate and a rear plate mounted on the bottom plate. The base further includes a separating plate vertically mounted on middle portion of the bottom plate. The cover has a plurality of V-shaped slots to receive the V-shaped ribs of the base, so that two or more boxes can steadily stack together.

1 Claim, 6 Drawing Sheets

STORING BOX FOR CASSETTE

BACKGROUND OF THE INVENTION

The invention concept as herein described, relates to cassette storing boxes which are used for containing and storing cassette tapes such as video cassettes as well as audio cassettes.

Cassette storing boxes are known in the art and such storing boxes have been standardly formed of plastic material. Such prior art cassette storing boxes were not easily disassembled. Additionally, when transporting or storing the prior art cassette boxes, such were found to occupy a large volume of space which was found to be uneconomical. Additionally, such prior art cassette boxes were not readily stackable since there was no removably securable engagement mechanism between consecutive boxes.

It is therefore an objective of the present invention concept to provide a cassette storing box for audio or video cassettes which would obviate and mitigate the above-referenced disadvantages of the prior art cassette storing boxes.

SUMMARY OF THE INVENTION

An object of the present invention concept is to provide a cassette storing box which may be easily disassembled when such is being transported and which may store cassettes in a manner which reduces the overall volume having a resulting lowering of the transportation expenses.

Another object of the subject invention is to provide a cassette storing box which includes a plurality of drawer members, each of which may contain an audio or video cassette.

A still further object of the present invention is to provide a cassette storing box which has a plurality of V-shaped slots formed on an upper surface and a plurality of V-shaped ribs on a bottom surface, formed in a manner such that the ribs of one storing box may be inserted into the slots of another storing box when the boxes are stacked one upon the other.

Novel features which are characteristic of the invention, together with further objectives and advantages thereof will be more easily understood from the following description considered in connection with the accompanying drawings and in which a preferred embodiment of the invention is illustrated. It is to be expressly understood, however, that the drawings are for the purposes of illustration and description only and are not intended as a definition of the limits of the invention concept.

DETAILED DESCRIPTION OF THE PREFERRED EMBODIMENT

Figure 1:
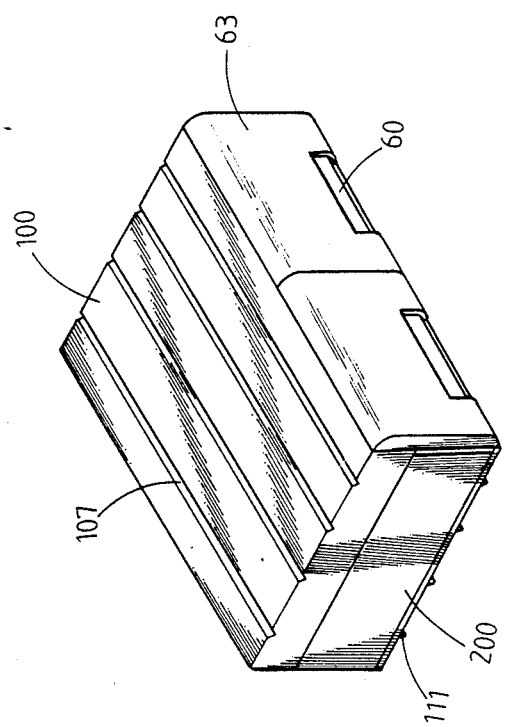
FIG. 1 is a perspective view of the cassette storing box in accordance with the present invention concept.
Figure 3:
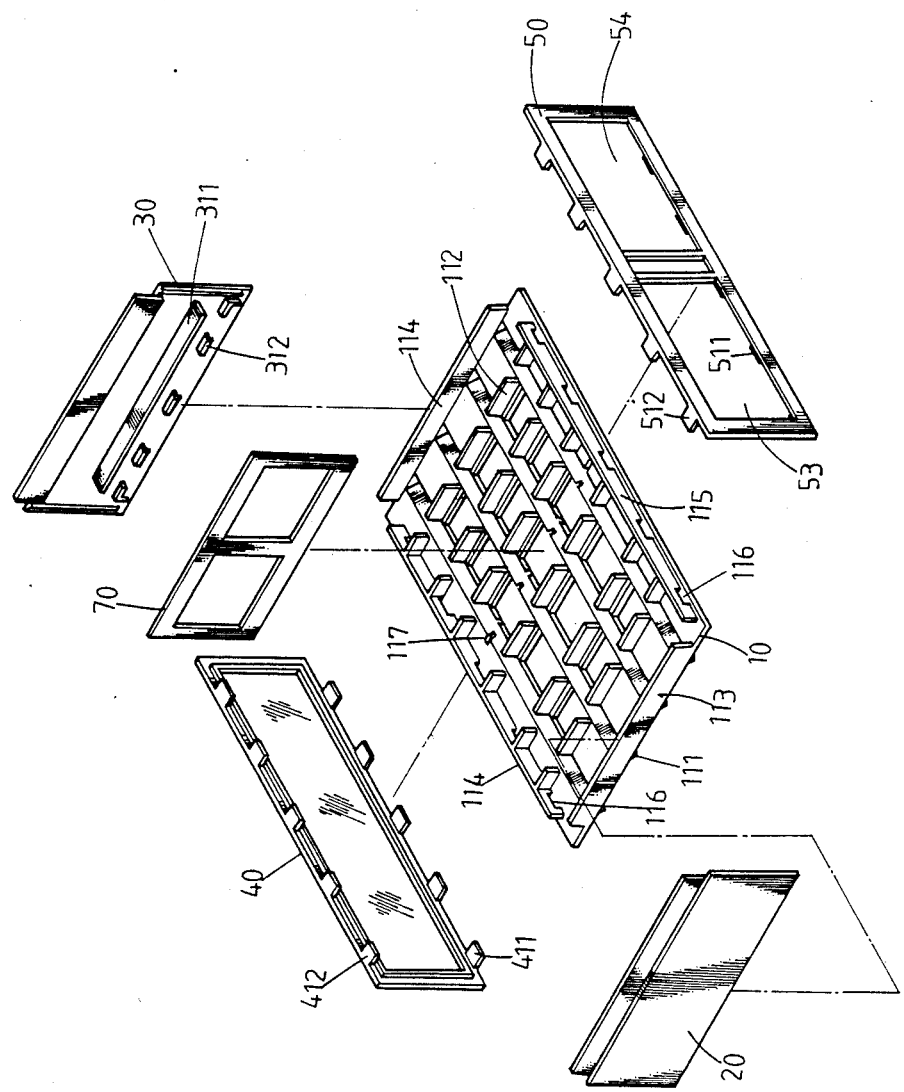
FIG. 3 is a perspective, exploded view of the base of the cassette storing box.
Figure 4:
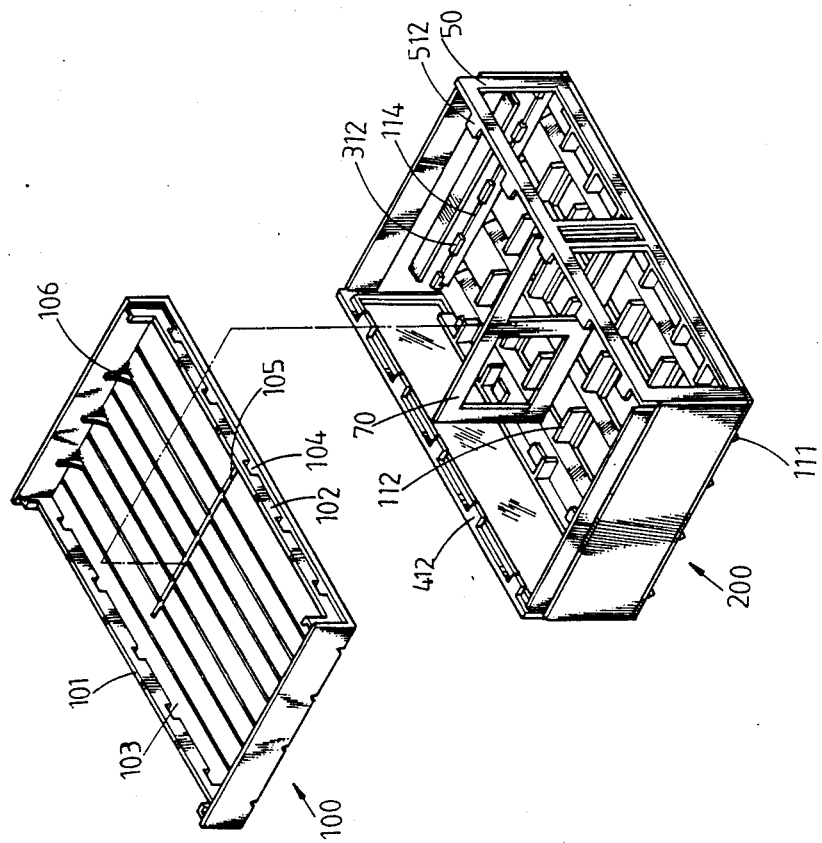
FIG. 4 is a perspective, exploded view of the cassette storing box in which a cover is shown and the drawers are removed.

Referring now to FIGS. 1, 3 and 4, there is shown a cassette storing box in accordance with the present invention concept. The cassette storing box includes base 200 and a cover member 100. Base 200 is formed in assembled fashion by bottom plate 10 having a pair of opposing side plates 20, 30 in combination with rear plate member 40 and front plate 50 as clearly shown in FIG. 3.

Figure 2:
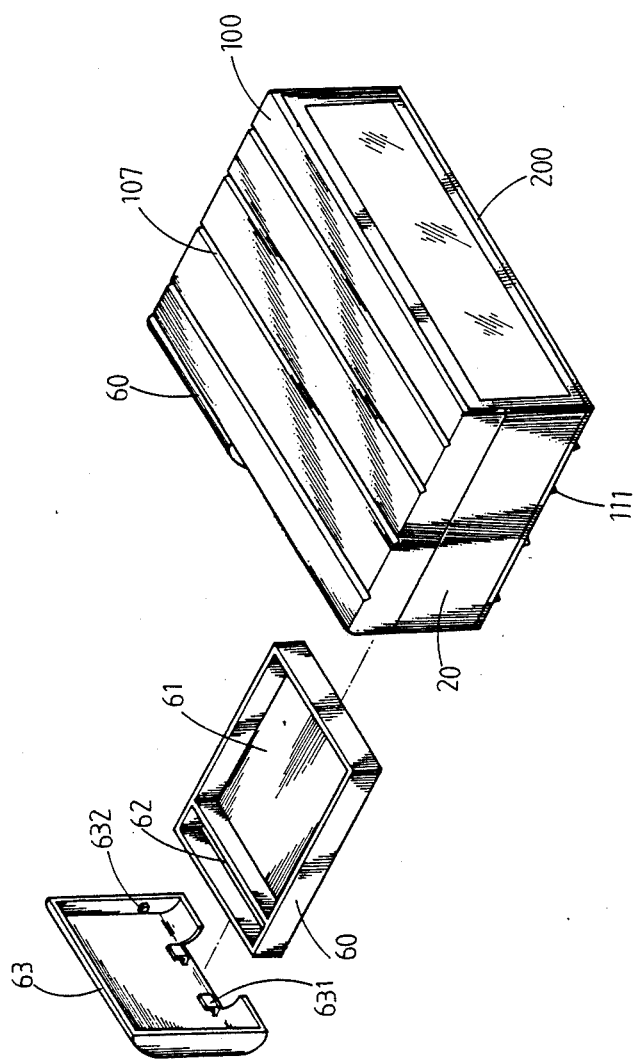
FIG. 2 is a perspective view partially exploded showing a drawer member and holder external to the cassette storing box.

Bottom plate 10 includes a plurality of V-shaped rib members 111 formed on a bottom surface and clearly seen in FIGS. 2, 3 and 4. A plurality of transversely directed slab members 112 are mounted on bottom plate 10 and extend upwardly as is shown in FIG. 3. Transversely directed slab members 112 are utilized to increase the structural integrity of the cassette storing box. Slab members 112 as is clearly seen divide bottom plate 10 into a plurality of lattice contours. The central lattices may be removed in order to reduce the weight of bottom plate 10 if such is deemed necessary by the user.

A pair of side slab members 113 and 114 opposing each other in a longitudinal direction are vertically formed on opposing sides of bottom plate 10 respectively as is clearly seen in FIG. 3. A pair of engaging slab members 114 and 115 are vertically formed on rear and frontal ends of bottom plate 10 respectively.

Each engaging slab member 114 and 115 has formed therethrough a plurality of engaging openings 116.

Each of front and rear plate members 50 and 40 are provided with a plurality of engaging tab members 511, 512 and 411, 412 formed on lower and upper ends thereof. Lower engaging tab members 511 and 411 may be inserted into engaging holes or openings 115 and 116 to engage and couple the front and rear plates 50 and 40 with bottom plate 10.

The front or frontal plate 50 is further provided with a pair of drawer openings 53 and 54 in order that a pair of drawers 60, as is seen in FIG. 2, may be inserted therethrough.

Each side plate 20 or 30 includes horizontal slabs 311 and a plurality of tabs 312 and 212 which are parallel to a respective horizontal slab 311 in order that a passage be formed between the respective tabs and slab members to allow drawer 60 to pass therebetween.

Slab members 311 and tabs 312 are provided in extended relation from side plate 30 as is clearly seen in FIG. 3. Bottom plate 10 includes slot 117 formed in a mid-portion thereof to allow separation plate 70 to be vertically inserted therein and maintain separation plate 70 in a removably secured positional location.

Cover 100 is mounted on base 200 as can be seen in FIG. 4. Cover 100 includes a pair of engaging slab members 101 and 102 respectively formed on rear and frontal ends of cover 100. Each of engaging slabs 101 or 102 is further provided with a plurality of engaging openings 103 and 104 in order to receive engaging tabs 412 or 512 formed on the rear or front plate members 40 or 50.

Figure 6:
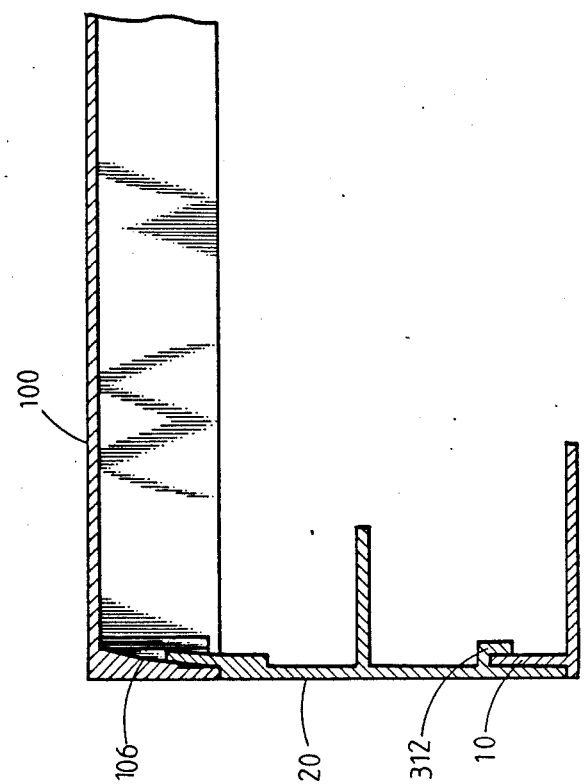

Substantially in the mid-portion of cover member 100 a slot 102 is provided to receive separating plate 70. A plurality of flanges 106 are formed on side portions of cover 100 in order to contact with upper portions of side plates 20 and 30 as is shown in FIG. 6. A plurality of V-shaped slat members 107 are formed on an upper surface of cover member 100 as is shown in FIG. 1 to receive V-shaped ribs 111 of base 200 in order that consecutive cassette storing boxes may be stacked one upon the other.

Figure 5:
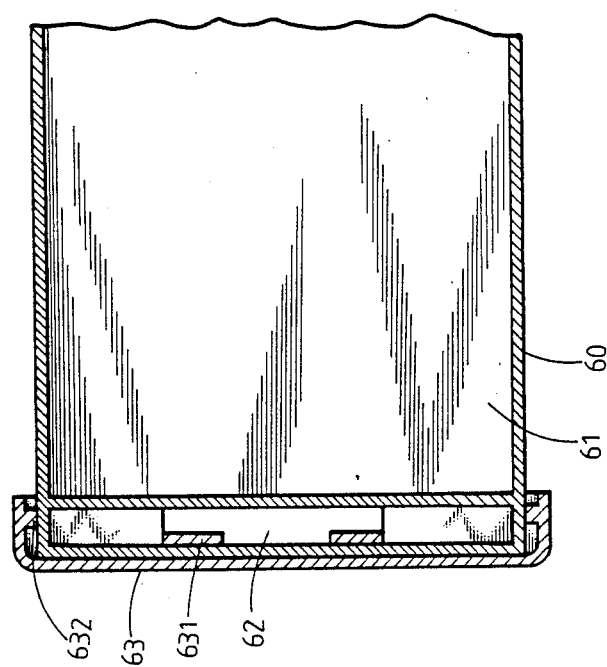
FIG. 5 is an enlarged partial cross-sectional view of the cassette storing box showing the engagement between the drawer and a holder; and, FIG. 6 is an enlarged, partial cross-sectional view of the cassette storing box showing the cover mounting on the base.

As is seen in FIGS. 2 and 5, drawer 60 includes a main body 61 utilized for containing a plurality of cassettes and a hollow frontal portion 62 to engage with holder 63. Holder 63 has a pair of hook members 631 to further engage with the front plate of front portion 62. Holder 63 further includes a pair of protrusions 632 formed on inner sides to contact with both sides of a drawer 60.

With respect to the invention concept, all of the elements of the cassette storing box as herein described according to the present invention concept may be easily assembled and disassembled. When transporting and storing boxes, the elements may be disassembled so that the space considerations and space requirements will be reduced. A user may simply assemble all of the elements into a cassette storing box with ease.

Although this invention has been described with a certain degree of particularity, it is understood that the present disclosure is made by way of example only and that numerous changes in the construction and the combination and arrangement of parts may be resorted to without departing from the spirit and scope of the invention as hereinafter claimed.

I claim:

1. A cassette storing box comprising:
   a base, said base including a bottom plate having a plurality of V-shaped ribs formed on a bottom surface thereof, a plurality of engagement openings formed through a pair of front and rear engaging slabs secured to said bottom plate, a plurality of transverse slabs formed on an upper surface of said bottom plate to enhance the strength thereof, a slot formed through a middle portion of an upper surface of the bottom plate, and a rear plate having a plurality of first and second engaging tabs; said first engaging tabs being inserted into said engagement openings of said rear engaging slab;
   a front plate having a plurality of first and second engagement tabs and a plurality of drawer openings; said first engagement tabs being inserted into said engagement openings of said front engaging slab;
   a separating plate vertically inserted into said slot;
   a pair of side plates mounted on opposing sides of said bottom plate, each of said side plates having a horizontal slab and a plurality of tabs parallel to the horizontal slab formed on an inner surface thereof to form a drawer passage;
   a plurality of drawers insertable into said base through said drawer openings of said front plate, each drawer having a main body to contain a cassette and a front hollow portion to engage a holder which has a plurality of hooks to engage a front plate of said front portion and a plurality of protrusions to contact side surfaces of said front portion; and,
   a cover mounted on said base having a plurality of cover engaging holes formed through a pair of front and rear engaging slabs thereof to allow said second engaging tabs of said front and rear plate to be inserted, a cover slot formed in middle portion of said cover to allow said separating plate to be inserted thereinto, a plurality of flanges formed on side portions of said cover to contact with said side plates; and a plurality of V-shaped slots formed through an upper surface of said cover to receive said V-shaped ribs of said base so that a plurality of said cassette storing boxes may be stacked.

* * * * *